United States Patent
Keppler-Ott

(10) Patent No.: US 9,746,030 B2
(45) Date of Patent: Aug. 29, 2017

(54) METHOD FOR PRODUCING AN EXTRUDED BEARING JOURNAL

(75) Inventor: Thomas Keppler-Ott, Feldkirch (AT)

(73) Assignee: THYSSENKRUPP PRESTA AKTIENGESELLSCHAFT, Eschen (LI)

(*) Notice: Subject to any disclaimer, the term of this patent is extended or adjusted under 35 U.S.C. 154(b) by 0 days.

(21) Appl. No.: 14/390,477

(22) PCT Filed: Apr. 3, 2012

(86) PCT No.: PCT/AT2012/000085
§ 371 (c)(1),
(2), (4) Date: Oct. 3, 2014

(87) PCT Pub. No.: WO2013/149270
PCT Pub. Date: Oct. 10, 2013

(65) Prior Publication Data
US 2015/0063737 A1    Mar. 5, 2015

(51) Int. Cl.
*B21K 1/00*    (2006.01)
*B21D 53/10*    (2006.01)
(Continued)

(52) U.S. Cl.
CPC ............... *F16C 33/64* (2013.01); *B21C 23/14* (2013.01); *B21C 26/00* (2013.01); *B21J 5/025* (2013.01);
(Continued)

(58) Field of Classification Search
CPC .......... F16C 19/26; F16C 19/46; F16C 33/64; F16C 2220/48; F16C 33/583; B21C 23/14;
(Continued)

(56) References Cited

U.S. PATENT DOCUMENTS 3,583,198 A * 6/1971 Drallmeier ............. B21K 1/762
                                                    72/358
3,950,834 A * 4/1976 Pitner ........................ B21J 5/12
                                                    29/434
(Continued)

FOREIGN PATENT DOCUMENTS

CN    2485128 Y    4/2002
DE    2819167 A1    11/1978
EP    0891825 B1    9/2003

OTHER PUBLICATIONS

German Language International Search Report for International patent application No. PCT/AT2012/000085; mailing date Dec. 21, 2012.
(Continued)

*Primary Examiner* — Sarang Afzali
*Assistant Examiner* — Darrell C Ford
(74) *Attorney, Agent, or Firm* — thyssenkrupp North America, Inc.

(57) ABSTRACT

In a method for producing an extruded bearing journal, the bearing journal is extruded in an extrusion tool by means of at least one extrusion punch and, after the extrusion of the bearing journal, reworking of the bearing journal is performed in order to improve the cylindricity of the bearing journal at least over a section of the longitudinal extent of the bearing journal. During the reworking, the bearing journal is arranged, at least over a section of its longitudinal extent adjoining its free end, in a cavity that is delimited in a radial direction of the bearing journal by a wall surface surrounding the lateral surface of the bearing journal, and a reworking punch which is movable in the longitudinal direction of the bearing journal is moved toward the free end of the bearing journal and is pressed against the face surface of the bearing journal and, in this way, a plastic deformation
(Continued)

of the bearing journal, with a flow of material of the bearing journal, is effected.

6 Claims, 7 Drawing Sheets

(51) Int. Cl.
| | |
|---|---|
| *B21D 53/00* | (2006.01) |
| *B23P 17/00* | (2006.01) |
| *B21J 13/00* | (2006.01) |
| *B21D 22/00* | (2006.01) |
| *F16C 33/64* | (2006.01) |
| *B21J 5/02* | (2006.01) |
| *B21K 1/76* | (2006.01) |
| *F16D 3/41* | (2006.01) |
| *B21C 23/14* | (2006.01) |
| *B21C 26/00* | (2006.01) |
| *B23P 15/00* | (2006.01) |
| *F16C 33/58* | (2006.01) |

(52) U.S. Cl.
CPC ............ *B21K 1/763* (2013.01); *B23P 15/003* (2013.01); *F16C 33/583* (2013.01); *F16D 3/41* (2013.01); *F16C 2220/48* (2013.01); *Y10T 29/49668* (2015.01)

(58) Field of Classification Search
CPC ......... B21C 26/00; B23P 15/003; B21J 5/025; B21K 1/763; F16D 3/41; Y10T 29/49668; Y10T 29/49636; Y10T 29/49643; Y10T 29/49671; Y10T 29/49673
USPC ............... 29/898, 898.04, 898.056, 898.057; 72/353.2, 54.6, 355.2, 355.6, 358
See application file for complete search history.

(56) References Cited

U.S. PATENT DOCUMENTS

| | | | | |
|---|---|---|---|---|
| 3,999,417 | A * | 12/1976 | Orain | B21J 5/12 72/354.2 |
| 4,078,414 | A * | 3/1978 | Orain | B21J 5/12 72/354.2 |
| 4,274,276 | A * | 6/1981 | Mettler | B21J 5/02 264/320 |
| 4,580,432 | A | 4/1986 | Breazeale | |
| 4,597,281 | A * | 7/1986 | Brandt | H01R 43/16 72/318 |
| 4,667,394 | A * | 5/1987 | Bode | H01R 43/08 29/597 |
| 4,785,648 | A * | 11/1988 | Budrean | B21D 17/02 72/265 |
| 4,870,846 | A * | 10/1989 | Budrean | B21D 17/02 72/344 |
| 5,119,663 | A | 6/1992 | Bottger | |
| 6,065,322 | A * | 5/2000 | Tabata | B21K 1/04 29/898.057 |
| 7,000,319 | B2 * | 2/2006 | Iihara | B21K 1/762 29/898 |
| 7,490,503 | B1 * | 2/2009 | Kanemitsu | B21D 53/18 72/348 |
| 2007/0101795 | A1 * | 5/2007 | Doi | B21K 1/762 72/356 |
| 2011/0193257 | A1 * | 8/2011 | Matt | B21K 1/761 264/155 |
| 2011/0224005 | A1 * | 9/2011 | Miao | B21J 5/02 464/111 |

OTHER PUBLICATIONS

English Translation of International Search Report for International patent application No. PCT/AT2012/000085; mailing date Dec. 21, 2012.

English abstract of US Counterpart patent No. US4274276A to DE2819167A1. Note, no English translation is available for the abstract of DE2819167A1.

English translation of the abstract of DE counterpart publication No. DE19712985 to EP0891825B1. Note, no English translation is available for the abstract of EP0891825B1.

German Language Written Opinion of the International Searing Authority for International patent application No. PCT/AT2012/000085.

English Translation of Written Opinion of the International Searing Authority for International patent application No. PCT/AT2012/000085.

English abstract of CN 2485128Y.

* cited by examiner

PRIOR ART

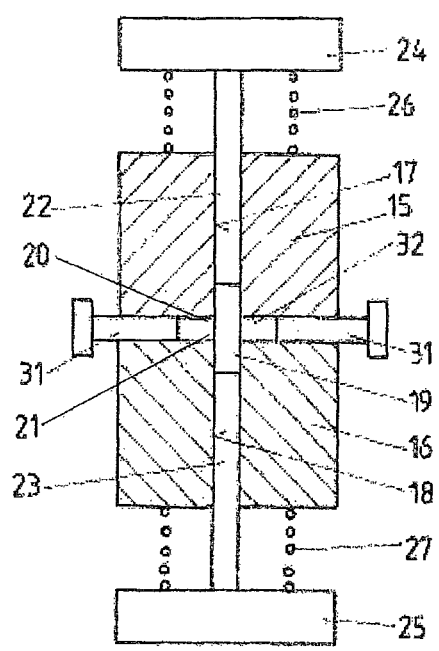
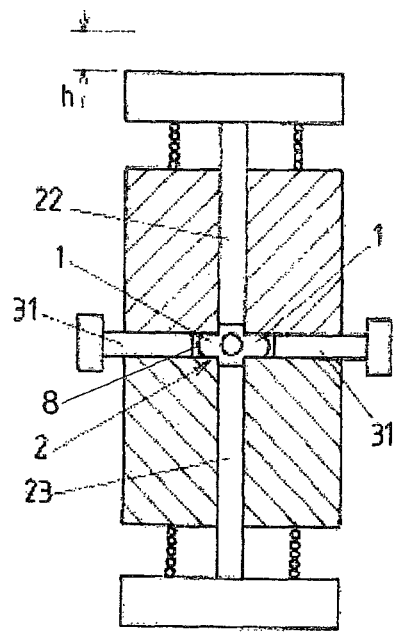
Fig. 11        Fig. 12
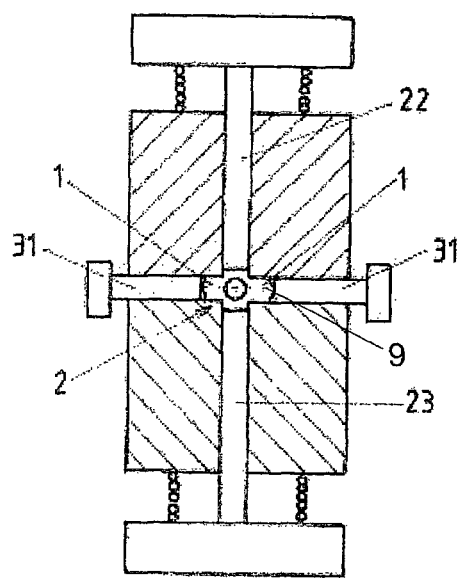
Fig. 13

METHOD FOR PRODUCING AN EXTRUDED BEARING JOURNAL

CROSS REFERENCE TO RELATED APPLICATIONS

This application is a U.S. National Stage Entry of International Patent Application Serial Number PCT/AT2012/000085, filed Apr. 3, 2012.

FIELD

The invention relates to a method for producing an extruded bearing journal, which extends in a longitudinal direction and which has a lateral surface surrounding a longitudinal central axis of the bearing journal and has a face surface delimiting the bearing journal in an axial direction at a free end, wherein the bearing journal is extruded in an extrusion tool by means of at least one extrusion punch and, after the extrusion of the bearing journal, reworking of the bearing journal is performed in order to improve the cylindricity of the bearing journal at least over a section of the longitudinal extent of the bearing journal. The invention also relates to a method for the reworking of an extruded bearing journal which extends in a longitudinal direction and which has a lateral surface surrounding a longitudinal central axis of the bearing journal and has a face surface delimiting the axial extent of the bearing journal at a free end of the bearing journal, in order to improve the cylindricity of the bearing journal at least over a section of the longitudinal extent of the bearing journal. The invention also relates to a bearing journal which extends in a longitudinal direction and which has a lateral surface surrounding a longitudinal central axis of the bearing journal and has a face surface delimiting the axial extent of the bearing journal at a free end of the bearing journal and the lateral surface of which is at least substantially of cylindrical form at least over a section of the longitudinal extent of the bearing journal.

BACKGROUND

In the case of bearing journals, in particular bearing journals of Cardan spiders (joint spiders) of Cardan joints, there is the general problem that it is sought to obtain as long as possible a bearing length in relation to the structural size using as simple as possible a production method. At the same time, the bearing journal should have as cylindrical a form as possible at least in the region of the bearing length, that is to say the lateral surface should, at least in the region of a bearing section, correspond as accurately as possible to a cylinder barrel, in particular to a shell of a circular cylinder, so as to form a good running surface for rolling bodies, in particular needle rollers.

Cardan spiders (joint spiders) with bearing journals, wherein the longitudinal central axes of the bearing journals lie in a plane and the longitudinal central axes of successive bearing journals are each at right angles to one another, or tripods in which three bearing journals lie in a plane, the longitudinal central axes of which journals each enclose an angle of 120° with one another, are conventionally produced by extrusion, in particular transverse extrusion. The production of a Cardan spider by extrusion, in particular transverse extrusion, emerges for example from DE 2819167 A1. The two dies (mould halves) have aligned cylindrical channels running at right angles to the parting plane between the dies, into which channels there is inserted a blank. Press punches are moved through the cylindrical channels toward the cylindrical blank from both sides, whereby a flow of the material of the blank into cutouts of the dies is effected, which cutouts adjoin the cylindrical channels in the region of the parting plane and have the shape of the journals to be formed. The material flow that forms the journals thus takes place transversely with respect to the direction in which the press punches are moved.

The face surface at the free end of the respective bearing journal is formed by a freeform surface. This forms an elevation of the face side of the bearing journal, said elevation being convex in the direction of the end of the journal. The transition between said freeform surface and the substantially cylindrical lateral surface of the bearing journal forms the end of the bearing section of the lateral surface and thus delimits the bearing length of the bearing journal.

To improve the cylindricity of the bearing journal in the region of the bearing section of the lateral surface, reworking of the bearing journal is normally performed. For this purpose, a grinding operation may for example be performed. Grinding operations however have the disadvantage that they are time-consuming and expensive, and therefore grinding operations of said type should be avoided as far as possible. From EP 0891825 B1, it is known, in the case of bearing journals, in this case in particular tripods, to perform a rolling operation for reworking after the extrusion process. During said rolling operation, it is possible, if desired, for grooves that run in encircling fashion around the bearing journal to simultaneously be formed into the lateral surface of the bearing journal.

SUMMARY

It is an object of the invention to provide a bearing journal whose lateral surface, over the greatest possible part of the longitudinal extent of the bearing journal, is of at least substantially cylindrical, in particular circular cylindrical form, preferably has the best possible cylindricity, wherein the bearing journal should be simple to produce.

According to the invention, this is achieved by means of a method for producing an extruded bearing journal according to the present disclosure and by means of a method for reworking an extruded bearing journal having the features as disclosed herein and by means of a bearing journal having the features as disclosed herein.

DETAILED DESCRIPTION

In the method according to the invention for producing an extruded bearing journal, wherein the bearing journal is extruded in an extrusion tool by means of at least one extrusion punch, it is provided that, after the extrusion of the bearing journal, reworking of the bearing journal is performed, during which the bearing journal is arranged, at least over a section of its longitudinal extent adjoining its free end, in a cavity that is delimited in a radial direction of the bearing journal by a wall surface surrounding the lateral surface of the bearing journal. During the reworking, a reworking punch which is movable in the longitudinal direction of the bearing journal is moved toward the free end of the bearing journal and is pressed against the face surface of the bearing journal with such a high pressing force that a plastic deformation of the bearing journal, with a flow of material of the bearing journal, is effected. Said plastic deformation of the bearing journal thus acts in the manner of an upsetting process, that is to say the overall length of the bearing journal is reduced. The reduction of the overall length of the bearing journal is in this case only slight (in particular less than 10% of the original overall length of the bearing journal) and occurs substantially in the region of the freeform surface at the free journal end. In particular, a material flow oriented in a radial direction, or a material flow with a component oriented in a radial direction, occurs in said end section of the bearing journal. Furthermore, in said end section of the bearing journal and/or in a section of the longitudinal extent of the bearing journal directly adjoining said end section, an axial material flow directed toward the free end of the bearing journal, or a material flow of the component oriented in said direction, takes place in a radial region of the bearing journal adjoining the radial position of the lateral surface of the bearing journal to the inside. Said material flow results in an increase in the length of the at least substantially cylindrical section of the bearing journal.

The lateral surface in the region of the at least substantially cylindrical section of the bearing journal, or at least the lateral surface in the region of a part of the axial longitudinal extent of said at least substantially cylindrical section of the bearing journal, forms a bearing section of the lateral surface, which bearing surface can thus be enlarged as a result of said plastic deformation of the bearing journal. Here, "at least substantially cylindrical" means that the bearing journal or the lateral surface thereof is, in said section, of cylindrical, in particular circular cylindrical form aside from production-induced inaccuracies and tolerances. Accordingly, the inclination of the lateral surface, that is to say its downward or upward slope in the longitudinal direction of the bearing journal in relation to the central axis of the bearing journal, is expediently less than 0.5°, preferably less than 0.2°. The deviations in the diameter of the lateral surface from the cylindrical form expediently amount, over the circumference, to less than 0.5%, preferably less than 0.05% of the diameter.

During the plastic deformation with the re-pressing punch, in addition to the material flow in the region of the freeform surface at the journal end and in the region directly adjoining this, a certain material flow may also occur in other regions of the bearing journal. Such a material flow, which in particular takes place at least substantially radially, may be effected in particular in regions of the longitudinal extent of the bearing journal in which a gap is present between the lateral surface of the bearing journal and the surrounding wall surface of the cavity before the pressing action is exerted by means of the reworking punch, in which gap the bearing journal or at least a section of the longitudinal extent of the bearing journal adjoining the free end of the bearing journal is arranged, when the reworking punch is pressed against the face surface of the bearing journal. The overall shape of the journal can also be influenced in this way. It is thus possible in particular to allow for hardening distortion that occurs during the hardening process after the moulding process; that is to say, as a result of such allowance for the hardening distortion, the cylindricity of the lateral surface is better after the hardening than before the hardening, at least in the bearing section of the lateral surface. Such allowance for the hardening distortion may be made with regard to the shaping in the longitudinal direction of the bearing journal and/or in the circumferential direction of the bearing journal. Hardening distortion may occur for example as a result of different internal stress preloads in different regions of the bearing journal that form during the moulding process of the bearing journal.

In the case of a bearing journal according to the invention, the face surface of the bearing journal has a concave region which surrounds an elevation that projects in the longitudinal direction of the bearing journal. In particular, said concave region surrounds the elevation completely, that is to say annularly.

Here, the concave region is formed by a moulded portion. The concave region is preferably formed by a freely moulded portion not bound to the shape of a tool, that is to say said concave region is a freeform surface. It is however conceivable and possible for said material flow to also be assisted by additional convex shaping of the reworking punch. However, there should preferably always remain a freely moulded portion, not bound to the shape of a tool, which forms at least a part of the concave shape, that is to say at least a part of the concave region is a freeform surface. In any case, the concave region is not formed by mechanical machining, for example by turning, milling or grinding.

It is advantageous if, between the lateral surface and the face surface or the functional contour and the face surface and in the region of the face surface, as viewed in the central longitudinal section, two sections are provided whose contours can be described in terms of radii, of which a first radius central point with a first radius is arranged within the functional part and a second radius central point with a second radius is arranged within the functional part. It is preferable here for the value of the first radius to be less than one fifth, preferably less than one tenth, of the value of the second radius. It is furthermore preferable for the value of the second radius to be less than four hundredths, particularly preferably less than two hundredths, of the value of the first radius.

In one advantageous embodiment, the face surface of the bearing journal has, in said concave region, a recess in relation to a circumferential edge of the face surface of the bearing journal. As viewed in the central longitudinal section through the bearing journal, the bearing journal thus extends less far in the longitudinal direction directed toward the free end of the bearing journal in the region of said recess than in the region of the circumferential edge of the face surface, which lies flush with the cylinder barrel-shaped bearing section of the lateral surface of the bearing journal. The bearing section of the lateral surface preferably terminates with (ends at) said circumferential edge of the face surface of the bearing journal, such that the lateral surface is thus of at least substantially cylindrical, in particular circular cylindrical, form in the direction of the free end of the bearing journal as far as said circumferential edge of the face surface.

By means of the design of the bearing journal according to the invention, it is thus possible to realize an increase in the axial extent of the at least substantially cylinder barrel-shaped lateral surface or of the at least substantially cylinder barrel-shaped bearing section of the lateral surface of the bearing journal. Furthermore, it is expediently possible for deviations from a state of cylindricity to be reduced. This means substantially that the shape deviations amount to less than 0.1 mm, preferably less than 0.05 mm, and even more preferably less than 0.01 mm, in relation to the journal diameter in the range from 5 mm to 20 mm.

In one advantageous embodiment of the invention, the reworking of the bearing journal with the plastic deformation by the reworking punch takes place after the bearing journal has been removed from the pressing tool in which the extrusion of the bearing journal has taken place. Then, a sleeve is pushed onto the bearing journal, which sleeve has the wall surface that surrounds the lateral surface of the bearing journal at least over that section of the longitudinal extent of the bearing journal which adjoins the free end of the bearing journal when the reworking punch is pressed against the face surface of the bearing journal and plastic deformation of the bearing journal is performed.

It is advantageously possible for a flow of material of the bearing journal to be effected by the sleeve as the sleeve is pushed onto the bearing journal. A bearing journal calibration step is thus performed as the sleeve is pushed on. By means of this calibration step, it is possible in particular for the roundness of the bearing journal to be improved, that is to say deviations of the cross section from the circular form can be reduced. This material flow results in a certain reduction of the diameter of the bearing journal, at least in regions.

It is advantageously possible for a flow of material of the bearing journal to be effected by the pulling-off of the sleeve that takes place after the plastic deformation of the bearing journal by the reworking punch. A bearing journal calibration step is thus performed as the sleeve is pulled off. In particular, it is possible in this way for smoothing of the lateral surface to be realized at least in the bearing section. This material flow results in a certain reduction of the diameter of the bearing journal, at least in regions. The reworking punch advantageously remains pressed with pressure against the end of the journal as the sleeve is pulled off. It is particularly advantageous here for the pressure force to be uniformly reduced, ideally regulated, as the sleeve is pulled off.

In another possible embodiment of the invention, the reworking with the plastic deformation of the bearing journal is performed by means of the reworking punch in the pressing tool. The wall surface that surrounds the lateral surface of the bearing journal at least over that section of the longitudinal extent of the bearing journal which adjoins the free end of the bearing journal during the pressing action of the reworking punch on the free end of the bearing journal is in this case formed by the dies of the pressing tool. In particular, each of the two dies of the pressing tool forms a respective part of said wall surface. For this purpose, the two dies each have a cutout, which cutouts together form the cavity into which the bearing journal is extruded by the extrusion punch. Continuations of said cutouts form a channel through which the re-pressing punch is introduced.

Calibration, where referred to within this document, refers to adjustment to correct dimensions by deformation means.

Further advantages and details of the invention will be explained below with reference to the appended drawing, in which:

FIGS. 11 to 13 are schematic illustrations of working steps for the production of a Cardan spider with four bearing journals as per a second embodiment of the invention, the pressing tool being illustrated partially in section;

Figure 1:
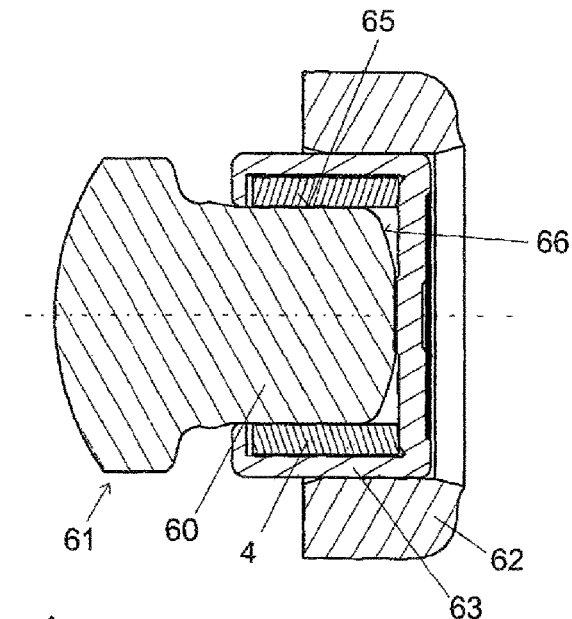
FIG. 1 shows a central longitudinal section through a bearing journal as per the prior art, which is mounted rotatably with respect to a joint yoke by means of a needle-roller bearing.

FIG. 1 shows an exemplary embodiment of a bearing journal 60 formed in a conventional manner, said bearing journal being part of a Cardan spider 61 for a universal joint. The bearing journal 60 is mounted rotatably with respect to a joint yoke 62. For this purpose, a bearing sleeve 63 is inserted in the opening of the joint yoke and, between the bearing sleeve 63 and the bearing journal 60, there are inserted needles 64 which roll on the lateral surface 65 of the bearing journal 60 at one side and on the inner side of the bearing sleeves 63 at the other side, whereby a needle-roller bearing is formed. The lateral surface 65 is of substantially cylindrical form at least in that section of its axial extent in which the needles 64 roll thereon.

At the free end of the bearing journal 60, the lateral surface 65 transitions into a face surface 66 that delimits the bearing journal 60 in an axial direction. The face surface 66 is arched convexly outward (in an axial direction), whereby a face-side elevation of the bearing journal is formed. In the embodiment shown, in a central region of the face surface, there is provided a relatively small recess into which an axial projection of the bearing sleeve 63 engages, whereby the bearing journal 60 is supported in an axial direction. The convexly curved region of the face surface 66 is formed by a freeform surface formed during the extrusion of the Cardan spider 61. In the mould cavity of the pressing tool, a boundary surface is arranged in the region of the recess in the face surface 66, against which boundary surface the material of the Cardan spider impinges during the extrusion. Recesses in the form of parts of spherical surfaces are thus also formed on the end side of conventional bearing journals.

Figure 2:
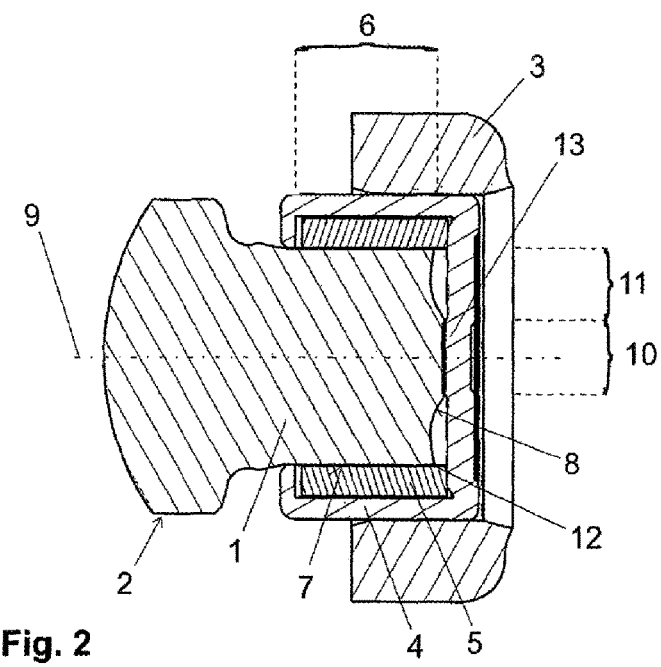
FIG. 2 shows a central longitudinal section through a bearing journal according to the invention, which is mounted rotatably with respect to a joint yoke by means of a needle-roller bearing.
Figure 3:
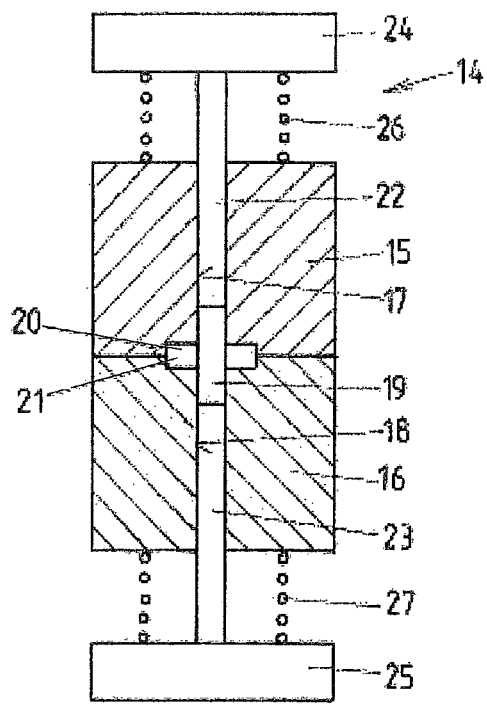
FIG. 3 is a schematic illustration of a pressing tool for the extrusion of a Cardan spider with four bearing journals, partially in section, with an inserted blank.
Figure 4:
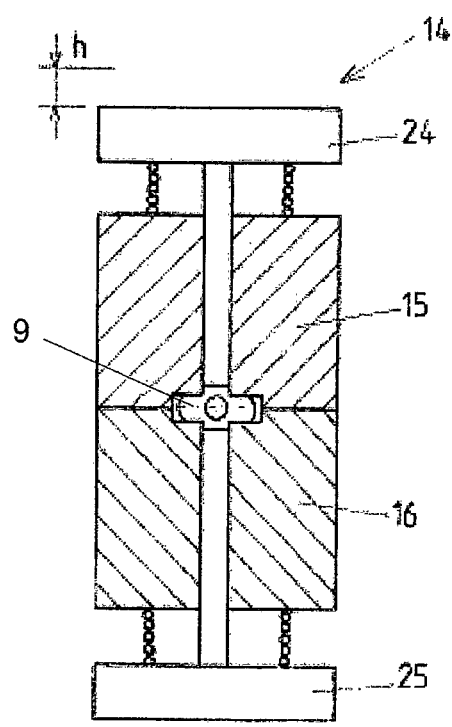
FIG. 4 is an illustration corresponding to FIG. 3, after the pressing process.

A bearing journal designed according to the invention can be seen from FIG. 2. The bearing journal 1 may be part of a Cardan spider 2 for a Cardan joint. The bearing journal may however also, for example, be part of a tripod or of some other component to be mounted in rotatable fashion. In the exemplary embodiment shown, the bearing journal 1 is mounted rotatably with respect to a joint yoke 3. For this purpose, a bearing sleeve 4 is arranged in an opening of the joint yoke 3, with rolling bodies 5 being situated between the bearing sleeve 4 and the bearing journal 1. Said rolling bodies are in this case in the form of needles. Additionally or instead, it would for example also be possible for balls or a plain bearing arrangement to be provided. The rolling bodies 5 roll on the inner side of the bearing sleeve 4 at one side and on a bearing section 6 of the lateral surface 7 of the bearing journal 1 at the other side.

The lateral surface 7 surrounds the longitudinal central axis 9 of the bearing journal 1. The direction of the longitudinal extent of the bearing journal 1 lies parallel to said longitudinal central axis 9.

At least in the region of the bearing section 6, the lateral surface 7 is of at least substantially cylindrical (cylinder barrel-shaped), in particular circular cylindrical form. Here, the cylinder axis is the longitudinal central axis 9. Here, the cylindrical shape may extend beyond the bearing section 6. Here, "substantially cylindrical" means cylindrical aside from inaccuracies or tolerances relating to the production process, as has already been discussed in the introductory part of the description.

In the region of its free end, the bearing journal 1 has, on the face side, a face surface 8 which delimits the bearing journal 1 in an axial direction, that is to say in the direction of its longitudinal central axis 9. The boundary between the lateral surface 7 and the face surface 8 may for example be considered as being where the normal to the surface of the bearing journal 1 undershoots an angle of 45° with respect to the longitudinal central axis 9 for the first time as viewed proceeding in the direction of the free end of the bearing journal 1 from an axially central region of the bearing journal 1 situated remote from the free end.

In a central region, the face surface 8 has an elevation 10 that protrudes in an axial direction in relation to a surrounding region. As viewed in a central longitudinal section (or in a side view of the bearing journal 1), the extent of the bearing journal 1 in the axial direction from its base towards its free end is thus greater in the region of the elevation 10 than in a region adjacent to the elevation. The point of greatest axial extent of the bearing journal 1 in said axial direction is preferably situated in the region of the elevation 10. The elevation 10 is completely, that is to say annularly, surrounded by a concave region 11 of the face surface 8. In the concave region 11, the face surface 8 is arched inwardly as viewed in relation to the axial direction. Here, in the illustrated embodiment, the face surface 8 has, in the concave region 11, a recess in relation to a circumferential edge 12 of the face surface (thus, in the region of said recess, the bearing journal extends less far in the axial direction from the base of the bearing journal 1 to its free end than the circumferential edge). At said circumferential edge 12, the face surface 8 adjoins the cylinder barrel-shaped bearing section 6 of the lateral surface 7 of the bearing journal 1.

The elevation 10 may, as illustrated, have a more or less pronounced central recess. Said recess can be engaged into by a projection 13 of the bearing sleeve 4, which projection supports the bearing journal 1 in the axial direction. The bearing journal 1 may however be supported in the axial direction in the region of the elevation 10 even without the latter being formed with a recess. It is even possible for an additional, for example stud-like elevation to be provided.

The production of a bearing journal according to the invention will be explained below, from a first exemplary embodiment of the invention, on the basis of FIGS. 3 to 10.

The bearing journal 1, or a component, in this case a Cardan spider 2, which has at least one bearing journal 1 to be formed in the manner according to the invention, is initially extruded. In the exemplary embodiment, the Cardan spider 2 to be formed has four bearing journals 1, the longitudinal central axes 9 of which lie in a common plane, wherein the longitudinal central axes 9 of successive bearing journals 1 as viewed in a circumferential direction are in each case at right angles to one another.

The extrusion is performed in a pressing tool 14 which has first and second dies 15, 16. The dies 15, 16 each have a bore 17, 18 which is at right angles to the parting plane between the dies 15, 16, wherein said bores 17, 18 are in alignment with one another and form a continuous channel. In a central part of said channel there is placed a cylindrical blank 19 which extends, over one part of its extent, into the bore 17, and over the other part of its extent, into the bore 18.

In the region of their parting plane, the dies 15, 16 have cutouts 20, 21 which together form cavities with cylindrical lateral surfaces. The longitudinal central axes of said cavities lie in a common plane, and a total of four cavities are provided, wherein the longitudinal central axes of successive cavities in a circumferential direction are in each case at right angles to one another (only two of said cavities can be seen in the sectional illustration of the dies 15, 16 in FIG. 3. Extrusion punches 22, 23 are introduced into the bores 17, 18, between which extrusion punches the blank 19 is situated. The extrusion punches 22, 23 are each mounted on a carrier plate 24, 25, with compression springs 26, 27 being arranged between the carrier plates 24, 25 and the dies 15, 16.

As a result of the carrier plates 24, 25 being pushed together by the travel h, the blank 19, if the extrusion punches 22, 23 have previously been placed in contact with the blank 19 at both sides, is likewise compressed by the magnitude h. Here, the material of the blank 19 is pressed into the cutouts 20, 21, wherein the material flows perpendicular to the direction of movement of the extrusion punches 22, 23. The bearing journals 1 are thus formed. Here, the free ends of the bearing journals 1 have a spacing to the boundaries of the cutouts 20, 21, such that freeform surfaces are formed in the region of the free ends of the bearing journals 1. Said freeform surfaces form the face surfaces 8 of the bearing journals 1 after the extrusion process.

Thus far, the production corresponds to the prior art, as described for example in DE 2 819 167 A1 as cited in the introductory part of the description.

Figure 5:
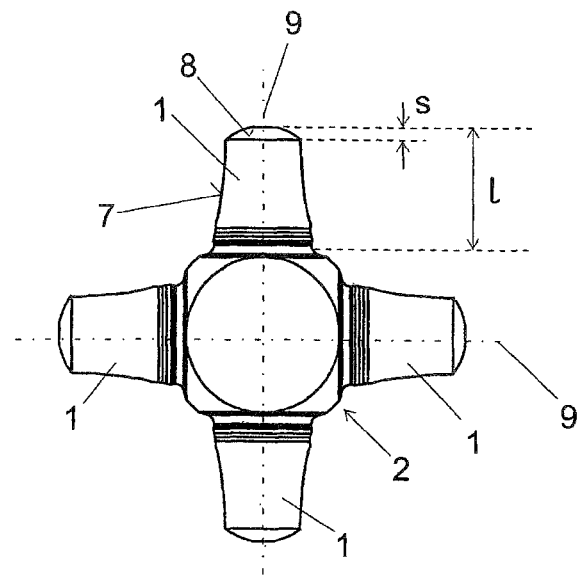
FIG. 5 shows a view of the Cardan spider removed from the pressing tool.

The Cardan spider 2 that is removed from the extrusion tool is illustrated in FIG. 5. The respective longitudinal central axis 9 of the bearing journals 1 is illustrated. The lateral surface 7 of the extruded bearing journal 1 surrounds the longitudinal central axis 9.

The lateral surfaces 7 of the extruded bearing journals 1 are illustrated in FIG. 5 as having a shape that deviates from the cylindrical shape, specifically with the bearing journals 1 tapering toward their free ends, substantially in conical fashion. The deviation from the cylindrical shape is in this case shown on a greatly exaggerated scale for illustrative purposes. The conicity may for example lie in the region of 0.2°.

The axial extent s of the elevation formed by the face surface may lie in the range from 1-2 mm, whereas the overall length l of the bearing journal may for example lie in the range from 5 mm to 15 mm.

Reworking of the bearing journals 1 is subsequently performed, wherein the reworking will be explained in more detail below on the basis of one of the bearing journals 1:

Firstly, a sleeve 28 is pushed onto the bearing journal in an axial direction of the bearing journal from the free end of the bearing journal. At least one axial section of the bearing journal 1 adjoining the free end of the bearing journal 1, in the exemplary embodiment the entire bearing journal 1, is then situated in the internal cavity of said sleeve 28. Said internal cavity of the sleeve 28 is thus surrounded by the internal wall surface 30 of the sleeve.

Figure 6:
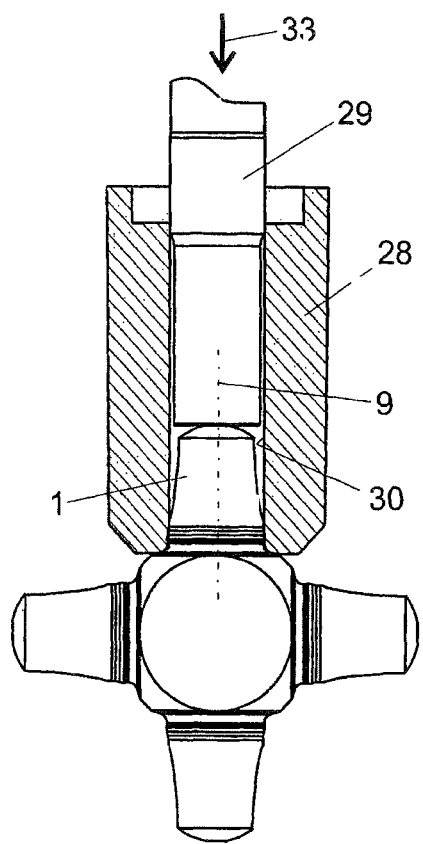
FIGS. 6 to 9 are schematic illustrations of working steps of the reworking of a bearing journal of the Cardan spider, partially in section.

Subsequently, a reworking punch 29 which is already projecting into or which is introduced into the sleeve 28 is moved in the axial direction of the sleeve 28 or of the bearing journal 1 until it makes contact with the free end of the bearing journal 1. This state is illustrated in FIG. 6 (the arrow 33 indicates the movement direction). Provision could also be made for the sleeve 28 together with the reworking punch 29 to be pushed axially toward the bearing journal 1 in the direction of the arrow 33 until the reworking punch 29 makes contact with the free end of the bearing journal 1, whereupon the end of the common axial movement of the sleeve 28 and of the reworking punch 29 is reached.

In FIG. 6, a gap is illustrated between the section of the lateral surface 7 adjoining the face surface 8 and the wall surface 30, surrounding the lateral surface 7, of the sleeve 28. It is thus not possible for the sleeve 28 to have effected any shaping of the bearing journal 1 during the process of said sleeve being pushed onto the bearing journal 1. It is however preferably also possible for the diameter of the sleeve 28 to be selected such that, as the sleeve 28 is pushed onto the bearing journal 1, a flow of material of the bearing journal 1 occurs in a layer adjoining the lateral surface 7, that is to say a first calibration step of the bearing journal 1 is performed already as the sleeve 28 is pushed on, for example in order to improve the roundness of the bearing journal 1.

Figure 7:
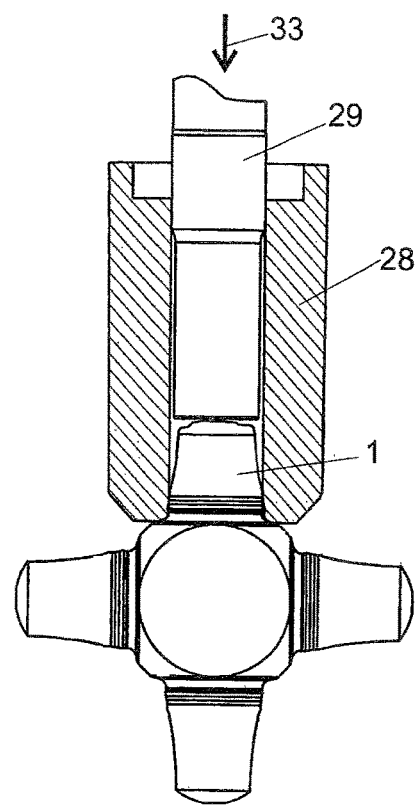
Figure 8:
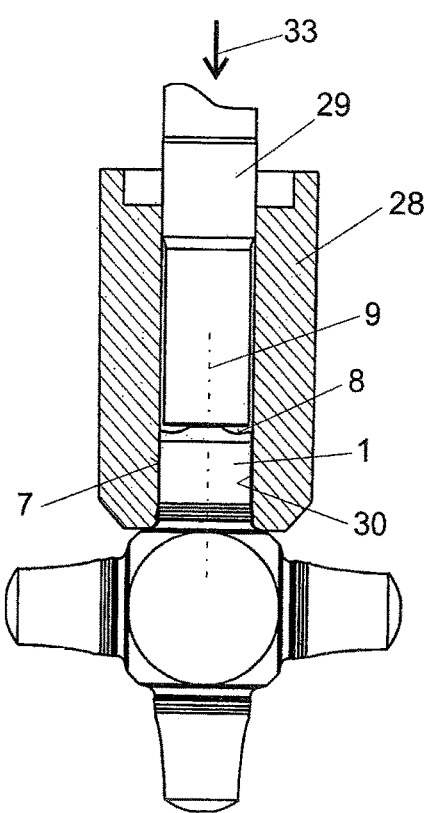

Subsequently, the reworking punch 29 is pressed against the free end of the bearing journal 1 (in the direction of the arrow 33) with such a high force that a flow of material of the bearing journal occurs. FIG. 7 shows an intermediate stage of said re-pressing process, and FIG. 8 shows the state at the end of said re-pressing process. Said re-pressing process has the effect that the bearing journal 1 is upset in particular in the region of the journal end. As a result of said upsetting, a flow of material of the bearing journal occurs in a radial direction, in particular in the region of the arched face surface 8. Gap regions that may have been present between the lateral surface 7 and the wall surface 30 before the re-pressing process may also be closed in this way. Furthermore, in the region of the outer circumference of the bearing journal 1, in a layer adjoining the wall surface 30, a material flow occurs in the end section of the bearing journal 1 in an axial direction opposed to the direction in which the reworking punch 29 is pressed against the end of the journal. This results in an elongation of the at least substantially cylindrical part of the lateral surface 7. The bearing section 6 of the lateral surface 7, over which said lateral surface serves for the mounting of rolling bodies 5, can be lengthened in this way.

Figure 9:
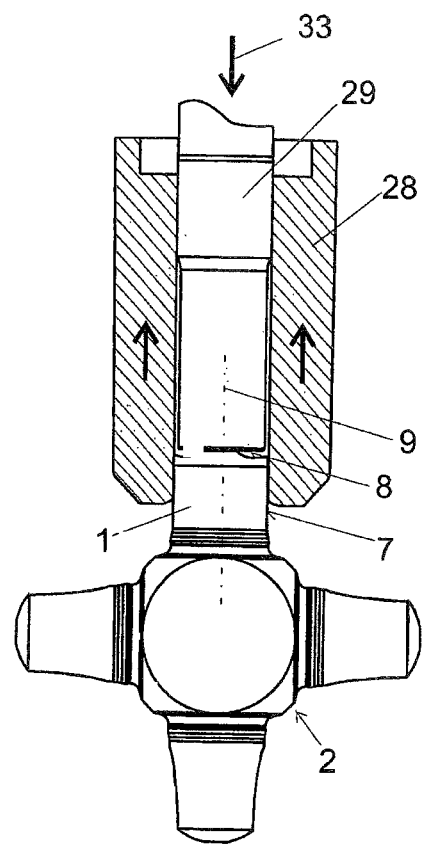

After the re-pressing process by means of the reworking punch 29, the sleeve 28 is pulled off the bearing journal 1, cf. FIG. 9. The sleeve 28 may in this case be pulled off counter to a high force directed counter to the pulling-off action, whereby the lateral surface 7 is subjected to an intense smoothing action. In other words, as the sleeve 28 is pulled off after the re-pressing process with the reworking punch 29, a flow of material of the bearing journal 1 is effected in a layer adjoining the lateral surface 7. It is preferably the case that, as the sleeve 28 is pulled off the bearing journal 1, the reworking punch 29 initially remains pressed against the free end of the bearing journal 1. Here, the pressing force may be lower than that during the upsetting of the journal end. The pressing action may in this case be maintained for a predefined length of time or for a predefined travel of the sleeve 28, and is expediently ended shortly before the sleeve 28 has been pulled completely off the bearing journal 1. The calibration result can be improved yet further through targeted control of the pressing force in a manner dependent on the movement travel of the sleeve 28 during the pulling-off process and/or on the movement force required for pulling the sleeve 28 off.

Figure 10:
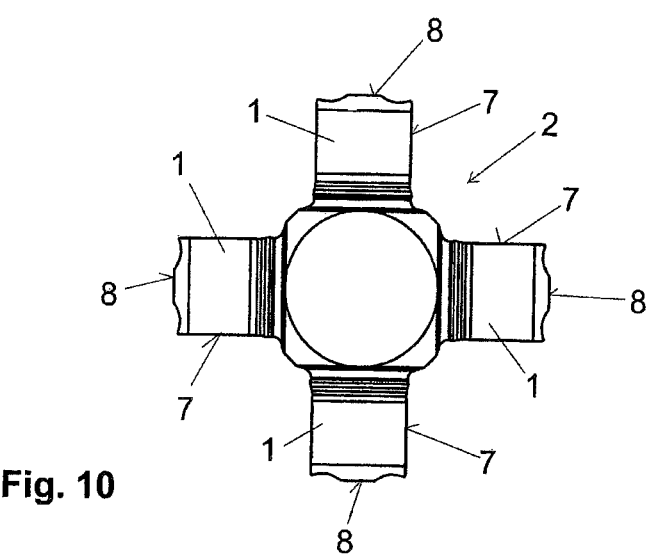
FIG. 10 shows a view of the Cardan spider with the reworked bearing journals.

The Cardan spider 2 with the bearing journals 1 that have all been reworked in the described manner is illustrated in FIG. 10.

If desired, during the reworking, a recess may be formed in a central region of the elevation 10, for example by way of a corresponding elevation in a central region of the reworking punch 29.

After the described reworking, the shaping processing steps on a bearing journal 1 designed in the manner according to the invention are advantageously completed. In particular, no subsequent grinding operations are required.

The bearing journal according to the invention can consequently be hardened in conventional fashion.

The described reworking may also be carried out simultaneously for two or more bearing journals. In particular, mutually opposite journals, the longitudinal central axes 9 of which lie in a line, may be calibrated simultaneously, whereby the support of the pressing forces is particularly advantageous.

A second exemplary embodiment of the production according to the invention of a bearing journal will be described below on the basis of FIGS. 11 to 13.

Again, the bearing journal, or the component that has the at least one bearing journal, is firstly extruded. Here, the pressing tool illustrated in FIG. 11 corresponds to the pressing tool described above with regard to FIG. 3, with the difference that the cutouts 20, 21 are extended as far as the respective side surface of the respective die 15, 16, such that an altogether cylindrical channel is formed. A reworking punch 31 is introduced into a respective cylindrical channel of said type, wherein a free space remains between the face-side end of the reworking punch 31 and the central channel that accommodates the blank 19. The material of the blank 19 is pressed into said cavity, so as to form the respective bearing journal 1, as the extrusion punches 22, 23 are advanced. Here, a spacing remains between the face surface of the respective bearing journal 1 and the reworking punch 31 over the entire extent of the face surface 8 (as illustrated in FIG. 12) or at least over a part of the extent of the face surface 8, wherein, in said spaced region, the face surface 8 is in the form of a freeform surface.

In this case, after the extrusion, the Cardan spider 2 remains in the pressing tool. The bearing journals 1 are thus arranged in a cavity delimited over its entire circumference by a wall surface 32, wherein said wall surface is formed partly by the first die 15 and partly by the second die 16.

As a result, the reworking punch 31 assigned to a respective bearing journal 1 is pressed against the free end of the bearing journal 1 such that a plastic deformation of the bearing journal, in particular in its end region, is generated. Here, the plastic deformation is the same as that described in the first exemplary embodiment. The Cardan spider 2 formed in this way is subsequently removed from the pressing tool.

Again, it is expediently the case that the shaping processing steps on the respective bearing journal are thus completed, and hardening of the bearing journals formed can be carried out. It would however also be conceivable and possible for at least one calibration step of the bearing journal or of a respective bearing journal to also be carried out after the component having the at least one bearing journal 1 is removed from the pressing tool and before the hardening process. For example, a sleeve can be pushed onto the bearing journal 1, wherein said sleeve causes a flow of material of the bearing journal as it is pushed onto the bearing journal. It would for example be possible for the roundness of the bearing journal to be further improved in this way.

Figure 14:
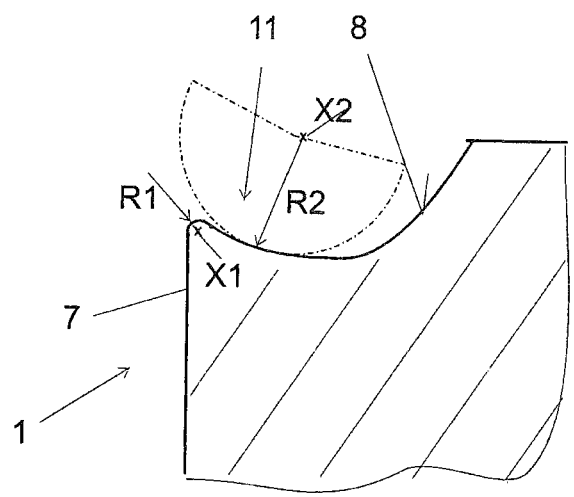
FIG. 14 is a schematic illustration for explanation of the concave region.

FIG. 14 is a schematic illustration of a concave profile in the functional part 1. The figure shows the transition region between the lateral surface 7 and the face surface 8. Here, as seen in the central longitudinal section, in the transition region between the lateral surface 7 and the face surface 8 and in the adjoining region of the face surface 8, two sections are formed, the contours of which can be described in terms of radii. The first section can be described by a first radius R1, the first radius central point X1 of which is arranged within the component. The second section, the concave region 11, can be described by a second radius R2, the radius central point X2 of which is arranged outside the component. It is preferable here for the value of the first radius R1 to be less than one fifth, more preferably less than one tenth, of the value of the second radius R2. It is furthermore preferable for the value of the second radius R2 to be less than four hundredths, preferably less than two hundredths, of the value of the first radius R1.

Instead of Cardan spiders 2, it is also possible for other components that have at least one bearing journal 1, for example parts with two opposite bearing journals or tripods, to be formed analogously to the described exemplary embodiments.

The invention claimed is:

1. A method for producing an extruded bearing journal that extends in a longitudinal direction and has a lateral surface surrounding a longitudinal central axis of the bearing journal and has a face surface delimiting the bearing journal in an axial direction at a free end of the bearing journal, the method comprising:
    extruding the bearing journal in an extrusion tool by at least one extrusion punch; and
    reworking the bearing journal after said extruding step so as to improve the cylindricity of the bearing journal at least over a section of the longitudinal extent of the bearing journal, said reworking including:
        arranging the bearing journal, at least over a section of the longitudinal extent adjoining the free end thereof, into a cavity delimited in a radial direction of the bearing journal by a wall surface surrounding the lateral surface of the bearing journal,
        pressing a reworking punch that is moveable in the longitudinal direction of the bearing journal against the face surface of the bearing journal at the free end thereof so as to plastically deform the bearing journal and cause a flow of the material of the bearing journal, and
    pulling a sleeve off the bearing journal after the reworking punch has plastically deformed the bearing journal, wherein the reworking punch is pressed against the face surface of the bearing journal after the reworking punch has plastically deformed the bearing journal at least until the sleeve has been partially pulled off the bearing journal.

2. The method of claim 1, further comprising:
    removing the bearing journal from the extrusion tool after said extruding step; and
    pushing the sleeve onto the bearing journal in a longitudinal direction of the bearing journal, the sleeve having the wall surface that surrounds the lateral surface of the bearing journal, at least over that section of the longitudinal extent of the bearing journal which adjoins the free end of the bearing journal.

3. The method of claim 2, wherein during said pushing step, the flow of material of the bearing journal is effected by the sleeve.

4. The method of claim 2, further comprising pulling the sleeve off of the bearing journal in the longitudinal direction after the plastic deformation of the bearing journal by the reworking punch, so as to cause the sleeve to effect a flow of material of the bearing journal.

5. The method of claim 2, wherein said pressing of the reworking punch results in plastic deformation of the bearing journal in the extrusion tool.

6. The method of claim 5, wherein the wall surface that surrounds the lateral surface of the bearing journal is a surface of dies within the extrusion tool.

* * * * *